Nov. 20, 1973    H. S. RUEKBERG    3,773,888

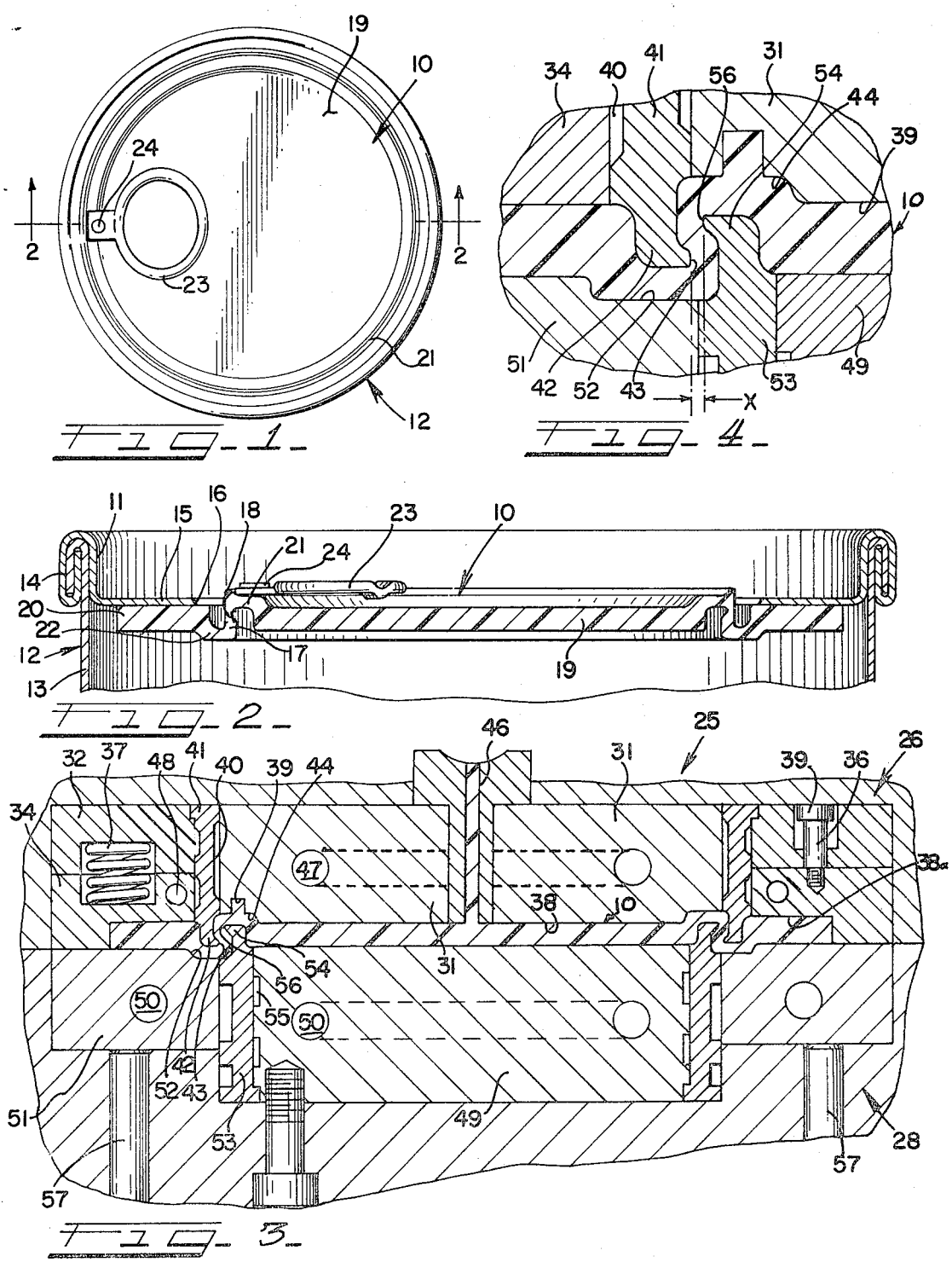
Nov. 20, 1973     H. S. RUEKBERG     3,773,888
METHOD FOR MAKING PLASTIC CLOSURE
Original Filed Oct. 27, 1969     2 Sheets-Sheet 1

METHOD FOR MAKING PLASTIC CLOSURE

Original Filed Oct. 27, 1969    2 Sheets-Sheet 2

United States Patent Office 3,773,888
Patented Nov. 20, 1973

3,773,888
METHOD FOR MAKING PLASTIC CLOSURE
Herbert S. Ruekberg, Highland Park, Ill., assignor to
Continental Can Company, Inc., New York, N.Y.
Original application Oct. 27, 1969, Ser. No. 869,710, now
Patent No. 3,642,408, dated Feb. 15, 1971. Divided
and this application June 10, 1971, Ser. No. 151,907
Int. Cl. B29f 1/14
U.S. Cl. 264—296
4 Claims

ABSTRACT OF THE DISCLOSURE

A plastic closure having a weakening line along which the closure is separable. The closure is formed in a mold which includes means for forming the weakening line of a predetermined thickness. The weakening line is initially molded to a thickness in excess of a predetermined thickness. The predetermined thickness of the weakening line is achieved by removal of the excess thickness during opening of the mold.

---

This is a division of application Ser. No. 869,710, filed Oct. 27, 1969, now U.S. Pat. 3,642,408, dated Feb. 15, 1971.

The present invention relates to easy-opening closure for use with containers and more particularly to a method and apparatus for making easy opening closures from plastic and for forming the plastic closure with a weakening line along which the closure is tearable.

Heretofore, easy opening plastic closures formed with weakening lines have been made either by forming the weakening line during the molding of the closure or by a subsequent scoring operation after molding of the closure. In both instances, the weakening line is defined by reducing the thickness of the closure along the line at which it is desired to tear the closure. Both of these prior methods have structural or economical disadvantages.

Considering first a weakening line formed by molding an area of reduced thickness, it has been found that the flow characteristics of plastic in a restricted area of a mold are such that there is a minimum thickness which may be in excess of that desired for easy separation or tearing along the weakening line.

The second method of forming the weakening line by thinning the wall along a line at which it is desired to tear the closure is generally accomplished by applying a scoring tool at room or elevated temperatures. This requires and additional operation after molding of the closure and thereby increases the cost of the closure.

In accordance with the present invention, it is proposed to provide a new and novel method and apparatus for making a plastic closure having a weakening line formed therein which overcomes the disadvantages encountered heretofore.

It is a further object to provide a new and novel method and apparatus for making an easy opening closure with a weakening line which is uniform and reduced thickness and has the desired tear characteristics.

The foregoing and other objects of the invention which will hereinafter appear are accomplished generally by a plastic closure which is molded and formed with a weakening line which is initially of a thickness in excess of the desired thickness. The excess thickness is reduced to the desired thickness by the removal of plastic as the molded closure is removed from the mold.

In the drawings:
FIG. 1 is a top plan view of the easy opening closure of the present invention applied on one end of a container;

FIG. 2 is an enlarged fragmentary cross sectional view of the container and closure taken generally along the lines 2—2 of FIG. 1;

FIG. 3 is a cross sectional view of a closure forming mold assembly in the closed position thereof;

FIG. 4 is a greatly enlarged fragmentary cross sectional view taken generally along the weakening line forming portions of the mold assembly shown in FIG. 3;

Figure 5:
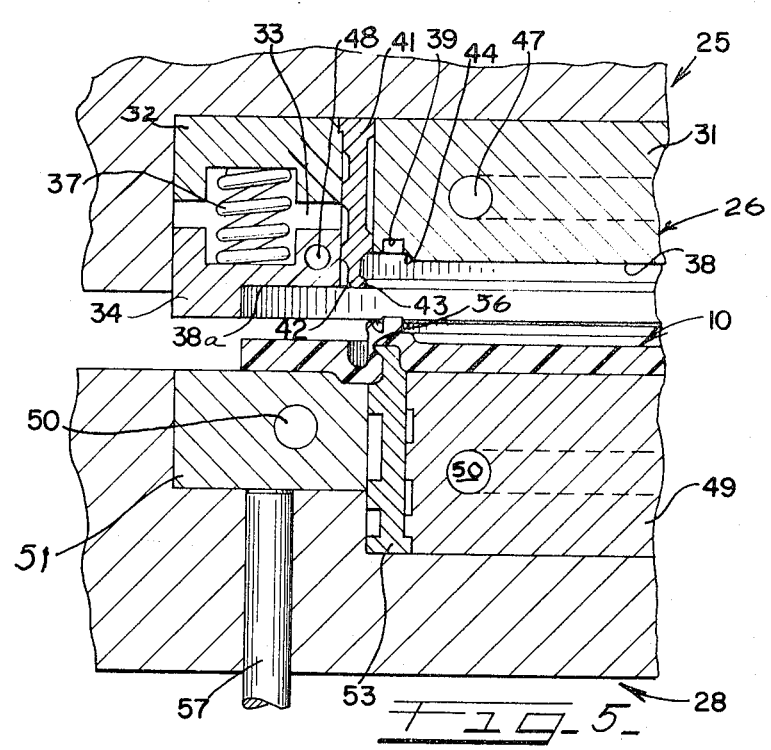
FIG. 5 is a fragmentary cross sectional view of the closure forming mold assembly in the open position prior to the ejection of the molded closure therefrom.

Referring now to the drawings in particularly FIGS. 1 and 2, the closure 10 constructed in accordance with the present invention is shown applied to a container 12. The container 12 includes a metallic tubular body 13 to the upper end of which a metal end 11 is fixed by means of a double seam 14. The end 11 is also made from metal and is formed with a panel 15 having an axial opening 16 in which the closure 10 is disposed.

The closure 10 is made from plastic such as polyethylene, polypropylene, or the like and may be of generally circular contour and is attached by means of a suitable adhesive to the panel 15. The closure 10 includes a web 17 formed with a weakening line 18 substantially concentric with and radially spaced from the edge defining the panel opening 16. As shown, the weakening line 18 is of considerably lesser thickness than the remainder of the closure 10. The weakening line 18 defines a rim 20 and central removable panel portion 19 which is separable by tearing from the remainder of the closure 10 upon the application of a pulling force. The web 17 including the weakening line 18 is joined to the removable panel portion 19 and the rim 20 at the upper and lower ends thereof by annular sections 21 and 22, respectively.

To facilitate the tearing along the weakening line 18, a pull tab 23 is fastened as by staking to a post 24 projecting from the removable panel portion 19. Upon lifting of the pull tab 23 and the application of an upward pulling force, the weakening line 18 is placed under tension and tears therealong when the tensile strength thereof is exceeded.

By the present invention, the weakening line 18 is fabricated in a manner to assure a uniform thickness along the length thereof and such that the tensile strength of the reduced thickness of plastic is maintained within a range permitting tearing thereof. To this end, the web 17 in which the weakening line is disposed is initially formed with a thickness in excess of the desired thickness of the weakening line 18. Thereafter, the web 17 thickness is reduced to the desired thickness by removal of plastic along at least a portion of the length thereof.

The closure 10 may be made in the molding apparatus 25 as shown in FIGS. 3-6. The molding apparatus 25 comprises a first mold assembly 26 and second mold assembly 28 mounted in a press for movement between an open and a closed position.

The first mold assembly 26 includes a center molding plate 31 and an annular plate 32. Slidably supported in an annular recess 33 is a stripper ring 34. The stripper ring 34 is supported by slide pins 36 and is biased to the position shown in FIG. 5 by means of a compression springs 37. Outward biasing movement of the stripper ring 34 is limited by heads 39 of the slide pins 36.

The inner face of the mold plate 31 and the stripper 34 are formed with molding cavities 38 and 38a in which the end closure 10 is formed. A post forming cavity 39 projects upwardly into the mold plate 31. Projecting downwardly from the plate 31 and into the cavity 38 is a web or weakening line forming member or ring 41 which is formed at the lower end thereof with an inwardly extending horizontal or laterally extending rib 42. The web forming ring 41 is disposed between the plate 31 and the annular plate 32. The ring 41 may be provided with recesses 40 to minimize heat transfer between the ring 41 and adjacent parts of the mold 26. The terminal end of the horizontal rig 42 terminates in web reducing surface 43 for removing plastic from the web 17.

An annular molding groove 44 is formed along the marginal edge of the plate cavity 38 and defines the outer surface of the annular section 21 of the closure 10. As shown, a sprue passage 46 through which molten plastic is introduced into the closed mold is provided in the first mold assembly 26. Coolant passages 47 and 48 connected to a suitable source of coolant fluid are provided in the stripper ring 34 and plate 31.

The second mold assembly 28 comprises a mold plate 49 in the form of a disk and an ejector ring 51 mounted for axial movement relative thereto. The upper surface of the ejector ring 51 is formed with an annular molding groove 52.

Disposed between the ejector ring 51 and fixed to the outer circumference of the mold plate 49 is a second annular web or weakening line forming ring 53 which is concentrically disposed relative to the weakening line forming ring 41. The ring 53 is of substantially the same structure as the first weakening line forming ring 41 and includes a horizontal or laterally extending rib 54 terminating in a web reducing surface 56. The ring 53 may be somewhat isolated from the ejector ring 51 and mold plate 49 by recesses 55. It is to be noted, the web reducing surface 56 of the rib 54 and the web reducing surface 43 of the rib 42 are vertically spaced from each other in the closed position of the mold and are laterally spaced by a distance X. The distance X determines the final thickness of the weakening line 18 as more fully to be explained hereinafter.

In the closed position of the mold as shown in FIGS. 3 and 4, the ribs 54 and 42 are vertically spaced from each other and from the associated grooves 44 and 52 to provide passages in which the closure annular sections 21 and 22 are formed. Also the opposing surfaces of the rings 41 and 53 are uniformly spaced from each other to form a passage through which a molten plastic is free to flow and form the continuous web 17. The spacing between the opposing surfaces of the ring 41 and 53 and ribs 54 and 42 is greater than the distance X. This is of significance because if these opposing surfaces are spaced equal to the distance X, the passage formed thereby may be restricted to the extent that the plastic is not able to flow freely therethrough and thereby preclude the formation of a continuous web.

Coolant passages 50 are provided in the plate 49 and the ejector ring 51. A plurality of pins 57 extend upwardly through the lower mold assembly whereby during opening movement of the latter, the ejector ring 51 is displaced relative to the mold plate 49.

In use, the first and second mold assemblies are initially closed as shown in FIG. 3. In this position, the mold assemblies define the mold cavity for forming the closure 10. Molten plastic is then introduced into the mold cavity as by injection through the sprue passage 46 to completely fill the cavity. The plastic flows into the center cavity 38 and the groove 44 over the rib 54 between the rings 41 and 53, past the rib 42 into the groove 52, and into the cavity 38a. It is to be noted that the ribs 54 and 42 face each other in undercut relationship so that the web which is formed therebetween is offset and thicker than the distance X.

Coolant flows through the coolant passages 47, 48 and 50 in the upper and lower mold assemblies 26 and 28 respectively. In this connection, it is to be noted that, as shown, the rings 41 and 53 are somewhat isolated from the other mold components by the recesses 40 and 55 so that the heat of the molten plastic in the vicinity of the rib 43 and 54 is not dissipated as rapidly as the heat from the plastic in the closure 10 adjacent to the water cooled parts of the mold. Thus the material in web 17 remains workable while the remainder of closure 10 becomes sufficiently rigid to be removed from the mold without loosing its shape. To assist in retaining the heat concentrated, the rings 41 and 53 may be of material having a lower coefficient of heat conductivity than the remainder of the mold.

It should be mentioned that under some circumstances the characteristics of the plastic used to make the closure 10 may be such that it may not be necessary to heat isolate the rings 42 and 54 in order to retain the plastic workable. Under these conditions, the ribs 41 and 53 may be made integral with the associated mold plates.

After rigidifying the closure 10 as above described, the mold is opened to the position shown in FIG. 5. During the opening movement, the web reducing surface 43 of the ring 41 wipes the plastic against the web reducing surface 56 of the ring 53 so that a portion of the plastic disposed therebetween is removed and displaced upwardly. At the same time, the stripper ring 34 in engagement with the closure 10 is operative to strip the latter from the mold assembly 26 so that the closure remains seated on the mold assembly 28. In this manner, the thickness of the web 17 at the reducing surface 56 is reduced, and thereby forms the weakening line 18 to the desired thickness.

Figure 6:
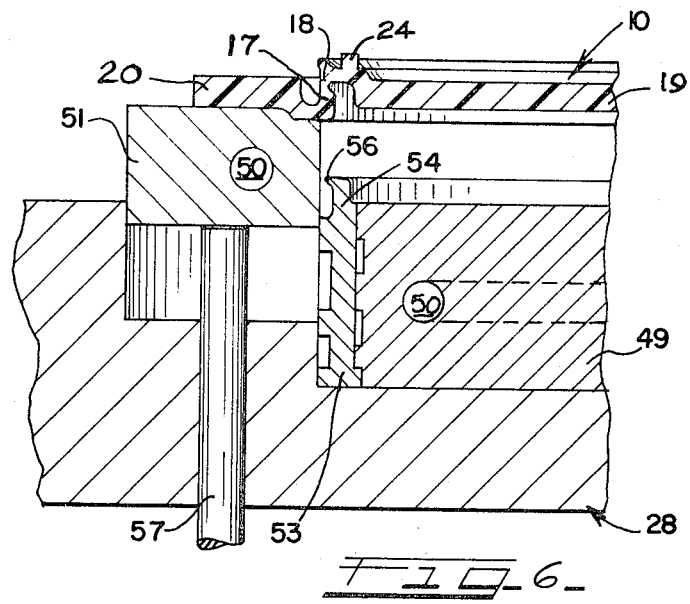
FIG. 6 is a fragmentary cross sectional view of the closure mold assembly similar to FIG. 5 but showing the molded closure being ejected therefrom.

In timed sequence thereafter, the ejector ring 51 is operative to eject the closure 10 out of engagement with the mold plate 49 as shown in FIG. 6. During the ejection, the web reducing surface 56 of the ring 53 is operative to wipe against the opposite face of the web 17. Depending on the characteristics of the plastic and the molding procedure, the plastic may be sufficiently workable so that the wiping action or the web reducing surface 56 may be operative to further permanently displace or remove a thickness from the web 17 so that the weakening line 18 constitutes substantially the full length thereof. Under any conditions, however, a thinned cross section defining the weakening line 18 is formed in the vicinity where the surface 56 was located during the molding of the closure 10.

What is claimed is:

1. A method of molding an easy opening plastic closure including a web of which at least a portion thereof is of a predetermined thickness lesser than the remainder of said closure and capable of being torn upon the application of a pulling force manually applied thereto to provide a weakening line defining a removable panel portion, said method comprising the steps of introducing molten plastic into a closure forming mold means which is movable between a closed and an open position and including web forming means having spaced means in offset overlapping relationship which in the closed position of the mold form an undulating web of a thickness in excess of said predetermined web thickness, and moving the spaced means linearly in opposite directions to reduce the thickness of said web to said predetermined thickness during opening of said mold means to form said weakening line.

2. The method as defined in claim 1 wherein the thickness of said web is reduced by removing said excess thickness of the web from at least one side of said web.

3. The method as defined in claim 2 wherein said excess thickness is removed by displacement from at least one side of said web.

4. The method as defined in claim 3 including the steps of maintaining a temperature differential between the web forming means and the remainder of said mold means whereby the plastic in said web is retained workable while the remainder of said molded closure is rigidified.

References Cited

UNITED STATES PATENTS

| | | | |
|---|---|---|---|
| 3,492,387 | 1/1970 | Larson | 264—296 X |
| 2,330,762 | 9/1943 | Tooker | 264—163 X |
| 3,013,303 | 12/1961 | Amazon | 264—161 |
| 3,350,487 | 10/1967 | Hofer | 264—161 |
| 3,196,483 | 7/1965 | Eyles | 264—161 X |
| 3,632,731 | 1/1972 | Lewis | 264—161 X |

ROBERT F. WHITE, Primary Examiner

R. R. KUCIA, Assistant Examiner

U.S. Cl. X.R.

264—163, 323, 327